Nov. 2, 1948.　　　　　J. S. BELTZ　　　　　2,452,980
BELT TENSIONING MECHANISM FOR CONVEYERS
Filed July 20, 1945　　　　　　　　　　　　3 Sheets-Sheet 1
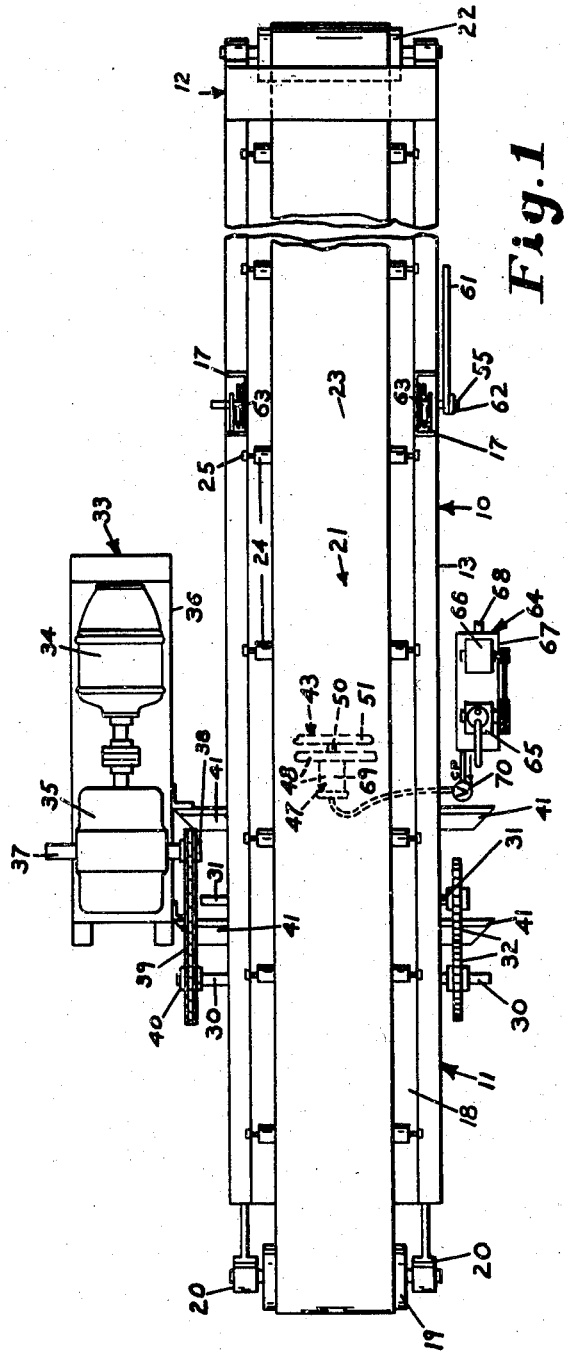
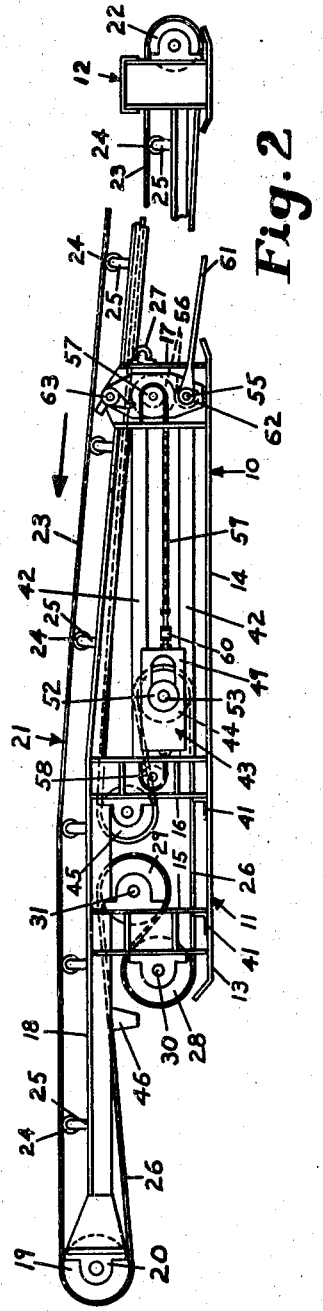
INVENTOR
JOHN S. BELTZ
BY
ATTORNEY Nov. 2, 1948. J. S. BELTZ 2,452,980
BELT TENSIONING MECHANISM FOR CONVEYERS
Filed July 20, 1945 3 Sheets-Sheet 2
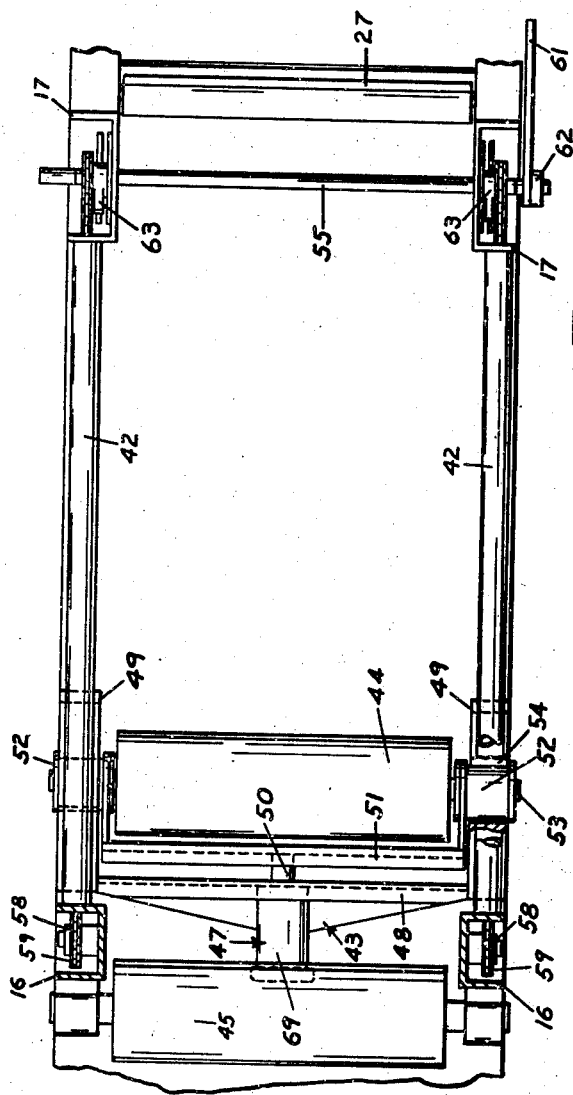
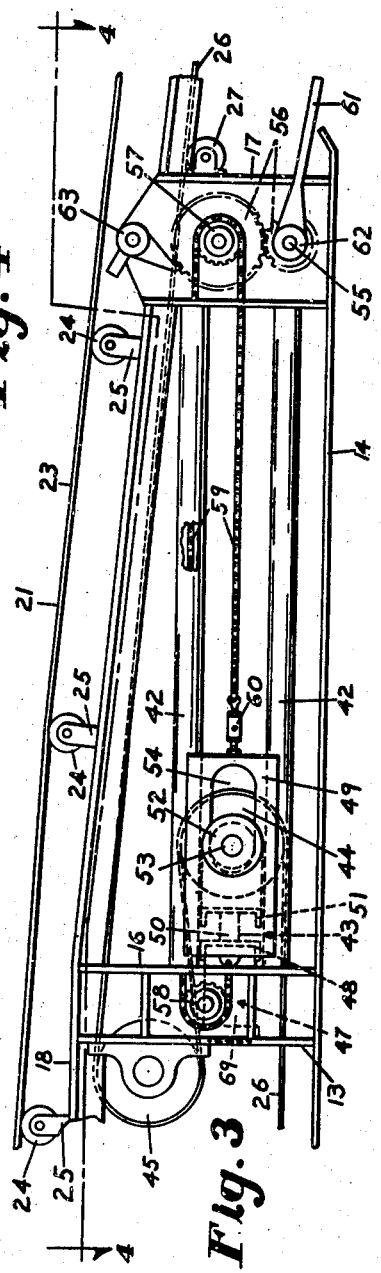
INVENTOR
JOHN S. BELTZ
BY
ATTORNEY Nov. 2, 1948.                J. S. BELTZ                2,452,980
                BELT TENSIONING MECHANISM FOR CONVEYERS
Filed July 20, 1945                                3 Sheets—Sheet 3

INVENTOR
JOHN S. BELTZ
BY
ATTORNEY

Patented Nov. 2, 1948

2,452,980

UNITED STATES PATENT OFFICE 2,452,980

BELT TENSIONING MECHANISM FOR CONVEYERS

John S. Beltz, Columbus, Ohio, assignor, by mesne assignments, to The Jeffrey Manufacturing Company, a corporation of Ohio Application July 20, 1945, Serial No. 606,237

4 Claims. (Cl. 198—208)

This invention relates to a conveyor and more particularly to a conveyor wherein the tension of the material carrying device thereof is maintained substantially constant.

It is an object of my invention to provide a conveyor in which a belt tensioning mechanism and its associated parts are located in the conveyor head member or section.

It is another object of my invention to provide a conveyor that includes in its head member or section a belt tensioning mechanism that applies tension to the belt of the conveyor by means of a pressure device that is adapted to exert a substantially constant tensioning force upon said belt and concomitantly accommodate variations in the length thereof.

In carrying out the foregoing object it is another object of my invention to train the belt of the conveyor over pulleys or drums in the conveyor head member or section so as to form a loop therein and to cause the tensioning mechanism to urge one of the pulleys to adjust the length of the loop in accordance with the tension of the belt.

It is yet another object of my invention to provide a conveyor including a head member or section embodying a pressure operated belt tensioning mechanism adapted to urge a belt receiving pulley thereof toward a belt tensioning position and to provide means in the head member or section for manually positioning the belt tensioning mechanism within its operating limits.

Other objects of the invention will appear hereinafter the novel features and combinations being set forth in the appended claims.

In the accompanying drawings,

Fig. 1 is a view in plan of one form of conveyor apparatus that embodies my invention;

Fig. 2 is a side view of the conveyor apparatus shown in Fig. 1, certain mechanisms thereof being omitted for the sake of clarity;

Fig. 3 is a side view on a larger scale of a portion of the conveyor apparatus shown in Figs. 1 and 2 and showing the tensioning apparatus for the belt of the conveyor;

Fig. 4 is a view in section, the section being taken substantially on line 4—4 of Fig. 3, the view omitting the belt of the conveyor for the sake of clarity;

Figure 5:
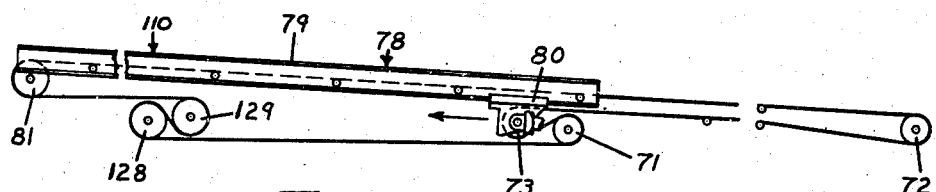
Fig. 5 is a diagrammatic side view of another form of conveyor appartus that embodies my invention.

Referring to the drawings and particularly to Figs. 1 and 2, the conveyor 10 embodied therein has a head member or section 11 and a foot or tail member or section 12 interconnected by one or more intermediate sections or members. The head member or section 11 is constructed about a frame 13 which includes a base or ground engaging skid pan 14. Pairs of oppositely disposed vertical side members 15, 16 and 17 extend upwardly from the base or ground engaging skid pan 14 and support a deck 18 that extends forwardly from above the base or skid pan 14 and supports a head pulley or drum 19 through suitable anti-friction bearings 20 which are secured to its outer end. The material carrying device of the conveyor 10 is in the form of a belt 21 that is trained about the head pulley or drum 19 and about a pulley or drum 22 of the foot or tail member 12. The upper run 23 of the belt forms the working or material conveying run of the conveyor 10 and is carried or supported between the head and tail pulleys or drums 19 and 22 by a plurality of idler rollers 24 supported by suitable brackets 25 that extend upwardly from the frame members of the conveyor apparatus 10. The overall height of the head section 11 increases progressively forwardly which with the overhang of deck 18 provides for ready discharge of material from belt 21 into mine cars or the like which may be positioned below head pulley 19. The lower or return run 26 of the belt 21 extends from the head pulley or drum 19 through the head member or section 11 of the conveyor 10 and is trained or looped about pulleys or drums that are supported by the frame 13. Foreign substances which might adhere to the belt 21 and intererefe with its operation as it passes over the pulleys or drums of the head member or section 11 are removed therefrom by a belt cleaner 46 carried by the deck 18. From the head member or section 11 the return run 26 of the belt 21 extends to the foot or tail pulley 22 over suitable belt supporting idler rollers 27, only one of which is shown.

A pair of pulleys or drums 28 and 29 for driving the belt 21 are carried by shafts 30 and 31, respectively, which are mounted on opposite sides of each vertical frame member 15 through anti-friction bearings. The shafts 30 and 31 are connected by gears 32 secured thereto and the pulleys are driven from a power unit 33 that includes an electric motor 34 and a speed reducer 35 mounted upon a suitable base 36. The slow speed shaft 37 of the speed reducer 35 carries a sprocket 38 that drives the pulley shafts 30 and 31 through a chain 39 and a sprocket 40 secured to one end of shaft 30. The frame 13 of the head member includes angle members 41 that extend outwardly from the sides thereof and to which the power unit 33 is attached. When the length of the conveyor 10 is relatively short it may be desirable to drive the belt 21 by the pulley 28 only and in such case the gears 32 are removed.

The conveyor 10 is particularly adapted for use in coal mines and because of the limited spaces in which the conveyor may be required to operate it is desirable that the gears 32 and power unit 33 be transposable from side to side thereof. To this end the angle members 41 and shafts 30 and 31 extend from both sides of head member 11.

The frame 13 of head member 11 carries a motor unit 43 (see Figs. 3 and 4) between two pairs of tubes 42 that extend between the vertical members 16 and 17. Motor unit 43 includes a pulley or drum 44. The vertical frame member 16 also carries a large idler pulley or drum 45 through suitable anti-friction bearings.

An important feature of my invention resides in the motor unit 43, its functions and position in the conveyor. The motor unit 43 includes a fluid pressure motor 47 that is carried by an adjustable frame 48, the end blocks 49 of which are slidably received between the pairs of tubes 42. The piston shaft 50 of fluid motor 47 is connected to a yoke 51 that carries pulley shaft supporting slides 52 which support the shaft 53 of pulley or drum 44 and are adapted to slide rectilinearly in slots 54 in the end blocks 49 of the frame 48 in a limited range.

The head frame 13 cooperates to provide a rack by which the position of the motor unit 43 may be adjusted independently of the motor 47 to bring into or to position the motor unit frame within the operating range of rectilinear movement of the pulley 44. The members 17 of the frame carry a cross shaft 55 which is geared through reduction gearing 56 to sprockets 57, one of which is mounted in each vertical member 17. Sprockets 58 carried by the vertical frame member 16 and sprockets 57 carry chains 59, the upper runs of which extend through the upper tubes 42 and the lower runs of which are connected to the end blocks 49 of the motor unit frame 48. A turnbuckle 60 is interposed in each chain 59 adjacent the blocks 49 for tightening them. A handle or lever 61 is mounted on the end of the cross shaft 55 through a reversible ratchet mechanism 62 for rotating the sprockets 57 and pawls 63 carried by vertical frame members 17 engage the reduction gearing 56 to retain the frame 48 of the motor unit 43 in its adjusted position.

The fluid motor 47 in the present embodiment of my invention is preferably, but not necessarily, an air motor which is supplied with compressed air from a motor-compressor unit 64 that is seen in Fig. 1. The motor-compressor unit 64 includes a compressor 65, an electric compressor driving motor 66 and a suitable compressed air storage or supply tank 67. The motor-compressor unit 64 may be any of the well-known types of such devices wherein a pressure control switch 68 is placed in the electric current supply lines of the driving motor 66 for starting and stopping said motor when the pressure in the storage tank 67 exceeds or falls below the desired pressure. The cylinder 69 of the fluid motor 47 is connected to the compressed air storage tank 67 through a pressure reducing valve 70 that is adapted to deliver air under constant pressure to the fluid motor 47 regardless of fluctuations of the pressure in the supply tank 67.

As seen in Fig. 2 of the drawings, the belt 21 is trained from the foot pulley 22 over the top of the conveyor 10 to the head pulley 19 and from the head pulley 19 over the driving pulleys 29 and 28. From drive pulley 28 the return run 26 of the belt is led over the fluid motor unit pulley 44 to idler pulley 45 and to the foot or tail pulley 22.

In operation the belt 21 is driven in the direction of the arrow seen in Fig. 2 by the power unit 33 through driving pulley 28 or pulleys 28 and 29 if the gears 32 are utilized. The motor-compressor unit 64 supplies air through pressure reducing valve 70 under constant pressure to the fluid motor 47 which causes the yoke 51 and pulley or drum 44 to move in a belt tensioning direction which in the conveyor 10 is toward the foot or tail member or section 12. Movement of the pulley or drum 44 toward the foot or tail member or section 12 applies tension to the belt 21 by increasing the length of the loop in the return run 26 that is formed by the pulley 44 between the driving pulley 28 and the idler pulley 45.

In conveyors that are adapted for use in confined spaces such as in coal mines for example, it is important that the height of the conveyor be maintained at a minimum and this I accomplish by causing the belt takeup loop between the pulleys 28 and 45 to lie within the head member or section and in substantially the same plane as the main runs of the conveyor belt 21. The placing of this automatic belt tensioning mechanism in the head section is of importance, particularly in long conveyors, since it is adjacent the driving motor and room entry, and thus readily available, particularly for adjustment of the unit 43 by the hand lever 61. Also the head section inherently or normally has increased height, thus readily accommodating such automatic takeup without increasing the normal height of the conveyor.

The length of such conveyors frequently reaches three thousand feet, therefore since the length of belts suitable for such long conveyors is subject to change for various reasons, such, for example, as variations in the load carried, changes in temperature, and the like, it is important that the belt be free to expand and contract and yet be retained under a substantially constant tension to prevent slipping at the driving pulleys or undue stretching of the belt.

The operating l'mits of motor unit 43 are determined by the length of the slots 54 in which the pulley supporting slides 52 function. In order to accommodate considerable lengthening of the belt 21 as it is used the position of the motor unit 43 is adjustable along the support tubes 42 through the reversible rack mechanism described and the motor unit 43 is adjusted manually to such position that the slides 52 are well within their working range. Should the tension on the belt become reduced for any reason the fluid motor moves the pulley or drum 44 in a belt tensioning direction which in the conveyor 10 is toward the foot or tail member 12. Movement of the pulley or drum 44 in this direction increases the length of the takeup loop in the return run 26 of the belt 21 while concomitantly maintaining the belt under a constant tension. Likewise, should the tension on the belt increase, the fluid motor 47 yields to permit the pulley 44 to move to accommodate the necessary change in length of the takeup loop to retain the belt under a substantially constant tension. Should fluid motor or cylinder 47 become completely expanded or contracted, the unit or carriage 43 may be adjusted by hand lever 61 so the automatic tensioning of the belt 21 will be restored.

The conveyor 110 shown diagrammatically in Fig. 5 is fundamentally the same as that of the conveyor apparatus 10 above described. In this embodiment the belt takeup or tensioning apparatus is preferably also located in the head section of the conveyor but its construction is different from that above described and involves no manual adjustment, the automatic takeup being for a longer stroke.

The takeup loop of the conveyor belt is formed between an idler pulley 71 and the foot or tail pulley 72 by a pulley 73 that is moved toward the head pulley 81, to tighten the conveyor belt 74, by a pair of fluid motors 75 that are of the piston type.

In this embodiment the full adjustment of the size of the takeup loop in the belt is accomplished by the fluid motors 75 which are of such length as to accommodate belt loops from the minimum to the maximum desirable lengths.

Figure 7:
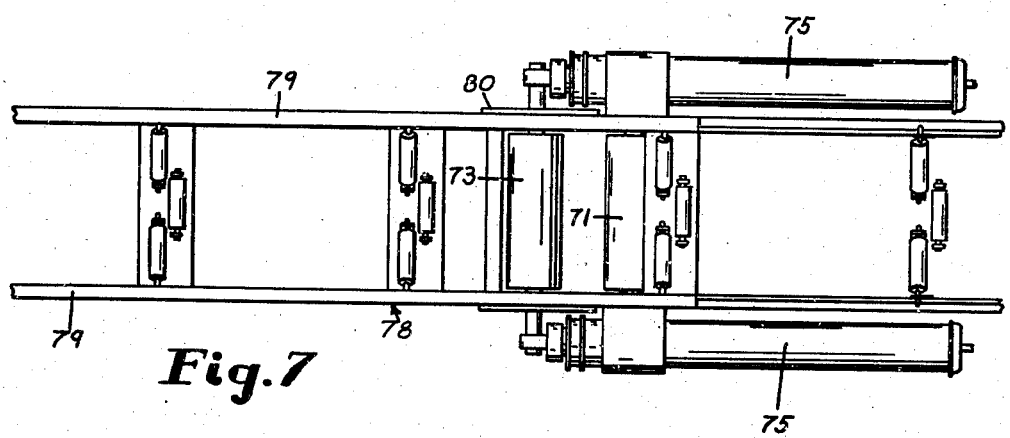
Fig. 7 is a view in plan of that portion of the conveyor apparatus shown in Fig. 6, the belt of the conveyor being omitted for the sake of clarity.
Figure 6:
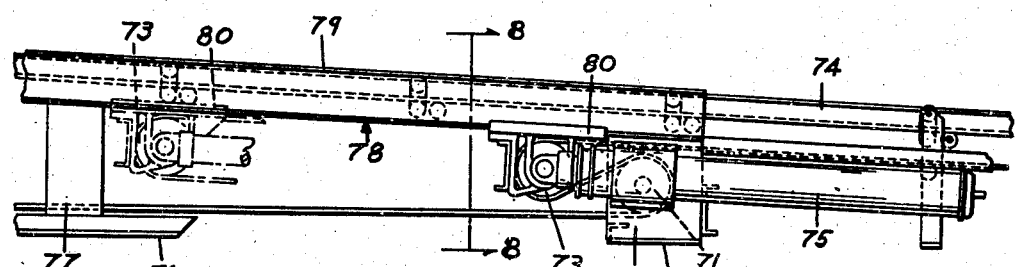
Fig. 6 is a side view in elevation of a portion of the conveyor apparatus shown diagrammatically in Fig. 5.
Figure 8:
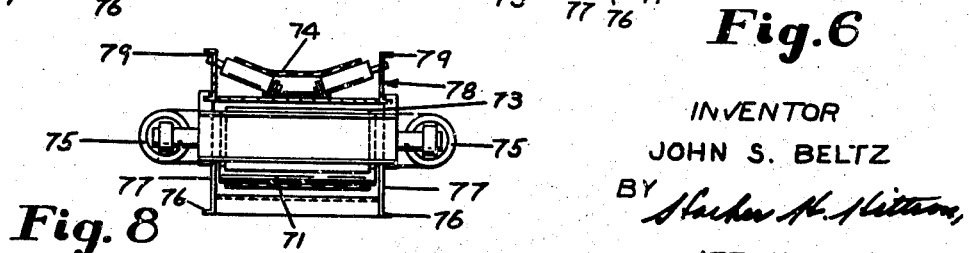
Fig. 8 is a view in section, the section being taken on line 8—8 of Fig. 6.

A portion of another head member or conveyor section is shown in Figs. 6, 7 and 8. This head section includes supporting skids 76 from which vertical side members 77 extend upwardly to support a deck 78 that includes channeled side members 79. In this embodiment the belt takeup pulley 73 is carried by a rack or sliding frame 80 that slides on channel members 79 of the head section frame and is moved toward the head pulley 81 by the pair of fluid motors 75 to keep the belt under predetermined tension, it being understood that the fluid motors are of the single acting type and receive air under substantially constant pressure from a motor-compressor unit 64 and that the head member or section of the conveyor 110 includes belt driving pulleys 128 and 129 which are driven by a power unit 33. The takeup loop in the conveyor belt is formed between an idler pulley 71 of the head member or section and the tail pulley 72 by the takeup pulley 73 and the takeup loop of the belt lies below and in the same general direction as do the main runs of the conveyor belt. While the arrangement of parts of the embodiments shown differ, their operation in maintaining the conveyor belt under substantially constant tension is similar. The conveyor of Figs. 5 to 8, inclusive, like the conveyor of Figs. 1 through 4, has its belt takeup or tensioning mechanism in its head section, the desirable features of which are above pointed out.

The conveyor embodied in Figs. 1 through 4 shows the belt 21 in the material conveying or working run 23 as being flat and the conveyor shown in the embodiment of Figs. 5 through 8 shows the belt in the material conveying or working run as being troughed. It is to be understood that the belt in the material conveying or working run of either conveyor may be flat or troughed as desired.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A head section for a conveyor including a main frame having a belt receiving pulley over which material is to be discharged, a pair of power driven belt driving pulleys mounted in said main frame rearwardly of said discharge pulley, another pair of belt receiving pulleys mounted in said main frame and located rearwardly of said power driven pulleys, a frame within said main frame mounting one of said last named pulleys for rectilinear movement in a limited range, fluid pressure means carried by said frame for urging said movable pulley in a belt tensioning direction, said pairs of pulleys all being located below the top of said head section main frame and between the sides thereof, and means for manually adjusting rectilinearly the position of said frame independently of said fluid pressure means for positioning it within the operating range of rectilinear movement of said pulley.

2. A head section for a conveyor including a main frame having a belt receiving pulley over which material is to be discharged, a pair of belt receiving pulleys mounted in said main frame and located rearwardly of said discharge pulley, a frame within said main frame mounting one of said last named pulleys for rectilinear movement in a limited range, fluid pressure means carried by said frame for urging said movable pulley in a belt tensioning direction, said pair of pulleys being located below the top of said head section main frame and between the sides thereof, and means for manually adjusting the position of said frame independently of said fluid pressure means for positioning the frame within the operating range of rectilinear movement of said pulley.

3. A conveyor including a head section and a tail section, said head section including a main frame having a belt receiving pulley over which material is to be discharged, a pair of power driven belt driving pulleys mounted in said main frame rearwardly of said discharge pulley, another pair of belt receiving pulleys mounted in said main frame and located rearwardly of said power driven pulleys, a frame within said main frame mounting one of said last named pulleys for rectilinear movement in a limited range, fluid pressure means carried by said frame for urging said movable pulley in a belt tensioning direction, said pairs of pulleys all being located below the top of said head section main frame and between the sides thereof, and means for manually adjusting rectilinearly the position of said frame independently of said fluid pressure means for positioning it within the operating range of rectilinear movement of said pulley.

4. A conveyor including a head section and a tail section, said head section including a main frame having a belt receiving pulley over which material is to be discharged, a pair of belt receiving pulleys mounted in said main frame and located rearwardly of said discharge pulley, a frame within said main frame mounting one of said last named pulleys for rectilinear movement in a limited range, fluid pressure means carried by said frame for urging said movable pulley in a belt tensioning direction, said pair of pulleys being located below the top of said head section main frame and between the sides thereof, and means for manually adjusting the position of said frame independently of said fluid pressure means for positioning the frame within the operating range of rectilinear movement of said pulley.

JOHN S. BELTZ.

REFERENCES CITED

The following references are of record in the file of this patent:

UNITED STATES PATENTS

| Number | Name | Date |
|---|---|---|
| 1,317,997 | Stuart | Oct. 7, 1919 |
| 1,663,344 | Lennard | Mar. 20, 1928 |
| 1,770,934 | Levin | July 22, 1930 |